United States Patent Office 3,591,689
Patented July 6, 1971

3,591,689
PROGESTATIONAL COMPOSITION IN ORAL DOSAGE FORM
Neil H. Mercer and Kenneth P. Stremming, Evansville, Ind., assignors to Mead Johnson & Company, Evansville, Ind.
No Drawing. Filed June 4, 1969, Ser. No. 830,520
Int. Cl. A61j 3/07; A61k 9/04, 17/06
U.S. Cl. 424—243                           6 Claims

ABSTRACT OF THE DISCLOSURE

A therapeutic composition comprising a solution of megestrol acetate in coconut oil in encapsulated form.

---

This invention relates to pharmaceutical compositions and more particularly to pharmaceutical compositions having effect upon the ovarian or menstrual cycle of women.

The administration of drugs which have an effect upon the ovarian cycle of women is, of course, well known. Several regimens for administration of such drugs have been employed for attainment of therapeutic objectives, e.g., inhibition of ovulation, correction of menstrual disorders, etc. Thus, one conventional regimen adapted for inhibition of ovulation involves the oral administration of ovulation-inhibiting progestogen-estrogen combinations as, for example, norethynodrel-mestranol combinations, for 20 days of the menstrual cycle. Another requires an estrogen alone, such as ethinylestradiol, for 16 days during the menstrual cycle. A progestogen such as, for example, dimethisterone, is added to the estrogen and the combination administered for an additional 5 or 6 days. Thus, according to either the simple combination or the sequential regimen, no drug is taken during part of the normal menstrual cycle. Another regimen which has been proposed and heralded as a major new concept in the field is the so-called "mini-dose" regimen according to which a progestational agent such as megesterol acetate in dosages substantially lower than those which will prevent ovulation are orally administered every day of the menstrual cycle. This regimen possesses certain inherent advantages such as freedom from side effects in that it does not interfere with the normal menstrual cycle and the drug, generally in the form of a tablet or capsule, is taken every day without interruption thereby eliminating the necessity for reliance on memory and rigid adherence to the treatment schedule as is mandatory for therapeutic effectiveness with a sequential type regimen (see, for example, J. Reprod. Fert., Suppl. 5 (1968), 167–172).

The present invention provides a composition in dosage unit form which is particularly advantageous for administration in accordance with the "mini-dose" regimen. The composition of this invention comprises a carefully selected amount of megestrol acetate dissolved in coconut oil or a coconut oil fraction with the solution being encapsulated in a soft gelatin capsule. By coconut oil fraction is meant a specific coconut oil triglyceride or mixture thereof. A preferred coconut oil fraction is MCT oil (medium chain triglycerides) which is a mixture of primarily $C_8$ and $C_{10}$ triglycerides containing less than 5% of $C_6$ and $C_{12}$ triglycerides. The term "coconut oil" when used herein is intended to refer to edible grade coconut oil generally recognized by the trade as such and comprised of triglycerides of natural or synthetic origin including purified fractions thereof as referred to above. The megestrol acetate, which more specifically is 17α-hydroxy-6-methylpregna-4,6-diene-3,20-dione acetate, is employed in amounts from about 0.35 to 0.5 milligrams per capsule. Coconut oil or a fraction thereof is particularly advantageous and unique as a solvent for the active progestational agent since the desired dose thereof can be dissolved in small amounts of coconut oil. This permits the use of capsules of relatively small size which is, of course, highly desirable from the standpoint of economy, ease of administration, and subject acceptance. The required amount of megestrol acetate can be dissolved in small amounts of the oil vehicle and encapsulated in gelatin capsules having a capacity (volume) as low as 2 or 3 minims (0.123 milliliters and 0.185 milliliters, respectively). When dissolved in such small amounts of coconut oil the therapeutic composition remains stable, that is, practically no crystallization of the active progestational agent occurs even with wide changes in temperature. Solution stability is not achieved with other solvent oils in general. The exceptional stability of coconut oil or fractionated coconut oil solutions is apparent from a comparison of the equilibrium solubility of megestrol acetate in several solvents. For this comparison the equilibrium solubility of megestrol acetate at 25° C., 15° C., 7° C. and 0° C. in coconut oil, MCT oil and ethyl oleate was determined by the following procedure: Saturated solutions were prepared by heating an excess of megestrol acetate in the above oils at 60° C. for 90 minutes. Samples were then stored at various temperatures for 13 days. Care was taken that each sample contained crystalline megestrol acetate so as to provide seed for crystallization. The samples were taken from storage and immediately filtered. The filtrates were then analyzed for determination of the megestrol acetate remaining in solution. In the case of oils which solidify at the temperatures used (e.g. coconut oil) samples were heated rapidly to 28° C. and then quickly filtered before appreciable dissolution of the precipitate occurred. The results are shown in Table I.

TABLE I.—THE SOLUBILITY OF MEGESTROL ACETATE IN SOLVENT OILS AT DIFFERENT TEMPERATURES

| Solvent | | Solubility | | | |
|---|---|---|---|---|---|
| | | 25° C. | 15° C. | 7° C. | 0° C. |
| Coconut | Mg./ml | 5.48 | 5.12 | 5.50 | 5.03 |
| | Mg./2 minim | 0.675 | 0.630 | 0.678 | 0.620 |
| MCT oil | Mg./ml | 9.11 | 9.02 | 8.08 | 8.76 |
| | Mg./2 minim | 1.12 | 1.11 | 0.995 | 1.08 |
| Ethyl oleate | Mg./ml | 5.03 | 4.57 | 3.49 | 3.17 |
| | Mg./2 minim | 0.620 | 0.563 | 0.430 | 0.391 |

As seen from the data in Table I, the solubility of megestrol acetate in coconut oil and in MCT oil is at least 0.620 mg./0.123 milliliters (the volume of a 2 minim capsule), while the solubility in ethyl oleate, another commonly used vehicle, is much less at the lower temperatures.

The physical stability of coconut oil solutions of megestrol acetate to temperature changes is shown by the following tests: Four solutions of megestrol acetate in coconut oil (edible grade, whole) were prepared to have the following concentrations: 0.75 mg./0.123 milliliters, 0.5 mg./0.123 milliliters, 0.5 mg./0.185 milliliters and 0.5 mg./0.26 milliliters. These solutions were compounded by mixing the solute and solvent at 60° C. for 2 hours and filtering the resultant solutions (while hot) to insure removal of any solid material. Portions of each preparation were then sealed in 2 milliliter glass ampules. In addition, a coconut oil "blank" which contained no drug was prepared in the same manner and utilized as a control. The filled ampules were then placed in a suitably insulated container which permitted only gradual temperature changes to occur. The storage container was equipped with a thermocouple and temperature recorder. This container was placed in suitable environments so as to cause the temperature of the ampules to be cycled between 4° C. and 30° C. At no time was the rate of temperature change greater than 2 centigrade degrees per hour. One complete cycle required about 65 hours. A representative cycle can be described as follows; time of temperature rise from 4° C. to 30° C., 16 hours; time at 30° C., 1 hour; time of temperature drop from 30° C. to 4° C., 47 hours; time at 4° C., 1 hour. Samples were periodically withdrawn from storage, warmed rapidly to 30° C., and examined for evidence of crystal formation before dissolution thereof occurred. The propensity of solutions of megestrol acetate in coconut oil to form crystals after exposure to 3, 5 or 8 complete temperature cycles, was evaluated by microscopic examination. Investigation revealed the existence of crystals in those samples containing 0.75 milligrams of megestrol acetate per 0.123 milliliters of coconut oil. Thorough examination of those cycled samples which contained 0.5 milligrams of megestrol acetate per 0.123 milliliters of coconut oil revealed no crystal formation. No crystalline material was found in any sample having a concentration of megestrol acetate lower than 0.5 milligrams per 0.123 milliliters of oil or in the coconut oil samples used as controls.

Administration of megestrol acetate in oil solution enhances the progestational activity of the drug. This has been demonstrated in the rat deciduoma test employing estrogen primed ovariectemized animals. It is also believed that the oral contraceptive effectiveness thereof is increased when administered in oil solution as a composition of the present type in sub-inhibitory doses with respect to ovulation according to the mini-dose procedure.

The compositions of the present invention can be readily formulated by mixing megestrol acetate with an edible grade coconut oil at temperatures of about 60° C. Preferably the mixing operation is conducted for a sufficient period to achieve substantially complete dissolution; periods of 1 to 2 hours being generally suitable. If desired, the solution can be filtered while hot to insure removal of any solid material. The solution is then incorporated in soft gelatin capsules of the type customarily employed in formulating pharmaceutical products. As previously indicated, the megestrol acetate is employed in amounts of from about 0.35 to 0.5 milligrams dissolved in from about 0.123 to 0.1725 milliliters of coconut oil. Accordingly, capsules having a fill capacity (volume) as low as 2 or 3 minims can be satisfactorily utilized to accommodate such dose levels of the progestational agent.

Unit dosage formulations having the compositions shown in the following table may be prepared according to the foregoing procedure.

UNIT DOSAGE PRODUCTS

| Unit | Weight of megestrol acetate (mg.) | Type of oil | Volume of oil (ml.) | Capsule size (minims) |
|---|---|---|---|---|
| 1 | 0.35 | Coconut | 0.123 | 2 |
| 2 | 0.5 | do | 0.1725 | 3 |
| 3 | 0.5 | do | 0.123 | 2 |
| 4 | 0.5 | MCT [1] | 0.123 | 2 |

[1] Medium chain triglycerides of coconut oil fatty acids containing up to 5% $C_6$ and $C_{12}$ acids and at least 95% $C_8$ and $C_{10}$ acids.

Those modifications and equivalents which fall within the spirit of the invention are to be considered a part thereof.

What is claimed is:

1. A composition in dosage unit form consisting essentially of a solution of megestrol acetate in coconut oil or a coconut oil fraction, said solution being encapsulated in a gelatin capsule, said megestrol acetate being present in not more than an effective mini-dose dosage amount which is lower than that dose which prevents ovulation, said mini-dose dosage to be orally administered to women every day of the menstrual cycle without interruption.

2. The composition of claim 1 wherein MCT oil is employed.

3. The composition of claim 1 wherein edible grade coconut oil is employed.

4. A composition in dosage unit form consisting essentially of from 0.35 to 0.5 milligram of megestrol acetate in coconut oil or a coconut oil fraction, said solution being encapsulated in a gelatin capsule having a volume of from about 2 to 3 minims.

5. The composition of claim 4 wherein a solution of about 0.5 milligrams of megestrol acetate in about 0.123 to 0.1725 milliliter of coconut oil is employed, said solution being encapsulated in a gelatin capsule having a volume of from 2 to 3 minims.

6. The composition of claim 4 wherein a solution of about 0.5 milligrams of megestrol acetate in about 0.123 to 0.1725 milliliter of MCT oil is employed, said solution being encapsulated in a gelatin capsule having a volume of from 2 to 3 minims.

References Cited

Rudel, H. W. et al. Fertil. Steril. 16: 158 (1965). The role of progestogen in the normonal control of fertility.

Brit. Med. J. pp. 730–732 June 17, 1967.

J. Reprod. Fert. Supp. No. 5, pp. 167–172 (1968).

Am. J. Obst. Gynec., pp. 122–127, Jan. 1, 1970.

SHEP K. ROSE, Primary Examiner

UNITED STATES PATENT OFFICE
CERTIFICATE OF CORRECTION

Patent No. 3,591,689          Dated  July 6, 1971

Inventor(s) Neil H. Mercer and Kenneth P. Stremming

It is certified that error appears in the above-identified patent and that said Letters Patent are hereby corrected as shown below:

Column 2, line 60, "0.26" should be -- 0.246 --

Column 4, line 45, "normonal" should be -- hormonal --

Signed and sealed this 4th day of January 1972.

(SEAL)
Attest:

EDWARD M. FLETCHER, JR.          ROBERT GOTTSCHALK
Attesting Officer                Acting Commissioner of Patents